Nov. 24, 1964  H. N. CLAUDY  3,158,163
FLOW CONTROL PROCESS AND APPARATUS
Filed Dec. 24, 1959  2 Sheets-Sheet 1

INVENTOR.
H. N. CLAUDY
BY
Hudson & Young
ATTORNEYS

INVENTOR.
H. N. CLAUDY

United States Patent Office 3,158,163
Patented Nov. 24, 1964

3,158,163
FLOW CONTROL PROCESS AND APPARATUS
Harry N. Claudy, Ridgefield, Conn., assignor to Phillips Petroleum Company, a corporation of Delaware
Filed Dec. 24, 1959, Ser. No. 861,892
5 Claims. (Cl. 137—8)

This invention relates to the analysis of sample materials by photometric means. In another aspect it relates to the control of repetitive operations.

This application is a continuation-in-part of my copending application Serial No. 591,620, filed June 15, 1956, now U.S. Patent 2,953,440.

In the production of phosphoric acid by the reaction of sulfuric acid with phosphate rock, it has been proposed to measure the sulfate ion concentration in the reactor to determine the correct rate of addition of the sulfuric acid. In accordance with the invention of my copending application, an analyzer is provided which is capable of determining the concentration of sulfate ions in a sample material. This analysis is based upon the reaction of barium ions with sulfate ions to form a white precipitate. This precipitate is measured photometrically.

An important feature of this analyzer resides in means to introduce the test material into a solution of barium ions at a constant rate. In accordance with the present invention, the sample material is directed through a narrow orifice so as to be added to the solution as individual drops. The amount of sample added to the reagent is thus dependent upon the size of the individual drops, as well as the dropping rate. It has been found that the size of the drops is dependent upon the dropping rate, so that it is necessary to maintain a preselected constant dropping rate. The dropping rate is conveniently measured by transmitting a beam of radiation to a detector. This beam is directed through the path of the drops so that the beam is interrupted by each drop. The output of the detector thus provides a signal which is representative of the dropping rate. This output signal preferably is applied to energize a stepping switch. At the beginning of the operation, a timer is energized to provide a signal representative of a predetermined time interval. This signal is compared with the movement of the stepping switch, and any difference therebetween controls a servo motor to adjust the size of the orifice in the conduit which supplies the drops. In this manner it is possible to maintain the dropping rate absolutely constant.

Accordingly, it is an object of this invention to provide apparatus to control the rate at which drops of liquid are added to a vessel.

Another object is to provide apparatus for controlling the rate of addition of a material to a container in discrete masses.

A further object is to provide apparatus to control repetitive operations.

Other objectives, advantages and features of the invention should become apparent from the following detailed description, taken in conjunction with the accompanying drawing in which.

Figure 1:
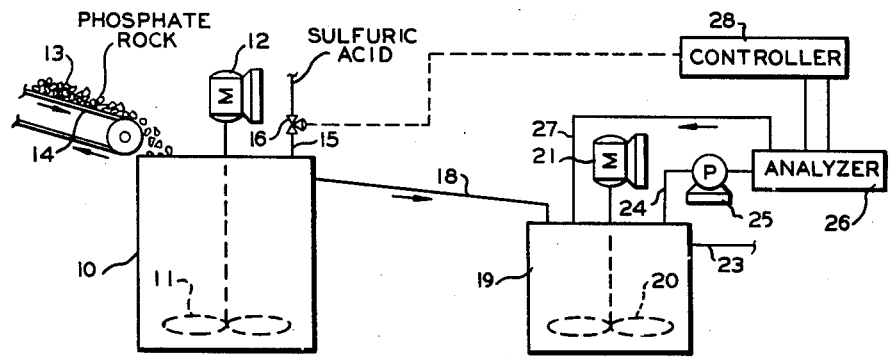
FIGURE 1 is a schematic representation of a control system for apparatus used in the production of phosphoric acid.

Referring now to the drawing in detail and to FIGURE 1 in particular, there is shown a reactor 10 having a stirrer 11 which is actuated by a motor 12. Ground phosphate rock (calcium phosphate) 13 is added to reactor 10 by means of a conveyor belt 14. Sulfuric acid is introduced into reactor 10 through a conduit 15 which has a control valve 16 therein. The mixture in reactor 10 overflows through a conduit 18 into a second reactor 19 which is provided with a stirrer 20 that is driven by a motor 21. The mixture is again agitated in reactor 19 and overflows into an outlet conduit 23. Additional reactors in series may be employed, if desired. In some applications a single reactor is all that is required.

A sample of the material in reactor 19 is withdrawn through a conduit 24, which has a pump 25 therein, and is directed to an analyzer 26. The sample is returned to reactor 19 from analyzer 26 through a conduit 27. Analyzer 26 determines the sulfate ion concentration in the sample stream and provides a representative output signal to a controller 28. The output signal from controller 28 adjusts valve 16 to regulate the rate of acid addition to reactor 10. If the measured sulfate ion concentration should exceed a predetermined limit, the rate of acid addition is decreased. Conversely, if the measured concentration of the sulfate ions should decrease below a second predetermined limit, the rate of acid addition is increased. Controller 28 can be a conventional instrument which provides an output regulated air pressure, for example, proportioned to an input electrical signal.

Figure 2:
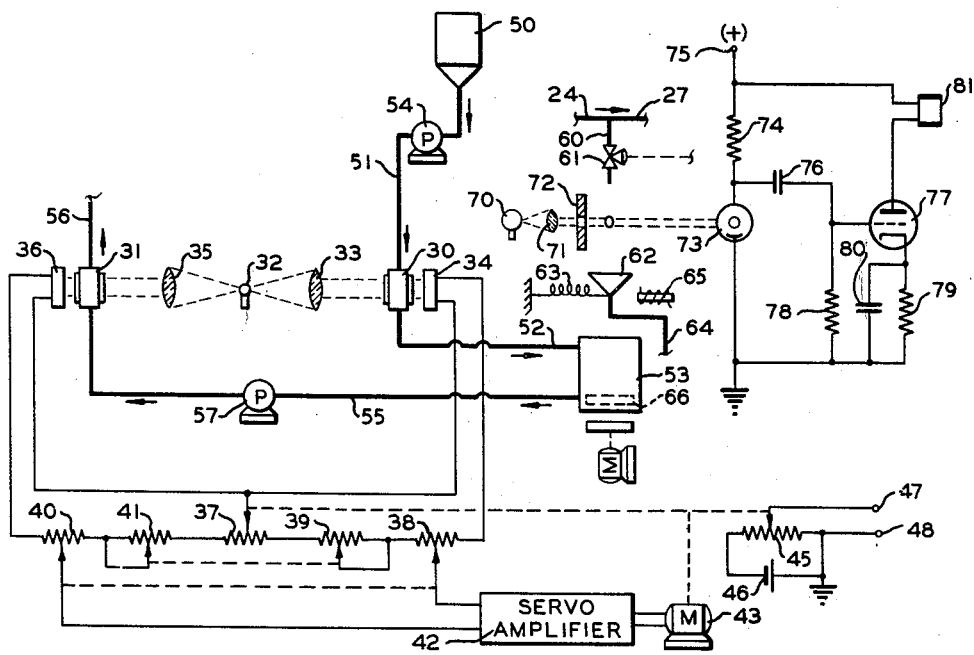
FIGURE 2 is a schematic representation of the photometric analyzer of this invention.

Analyzer 26 is illustrated in detail in FIGURE 2. This analyzer comprises first and second sample cells 30 and 31 which have radiation transparent windows. A first beam of radiation is directed from a lamp 32 by a collimating lens 33 through cell 30 to impinge upon a photocell 34. A second beam of radiation from lamp 32 is directed by a second collimating lens 35 through cell 31 to impinge upon a second photocell 36. Corresponding first terminals of photocells 34 and 36 are connected to one another and to the contactor of a potentiometer 37. The second terminal of photocell 34 is connected through a potentiometer 38 and a variable resistor 39 to the first end terminal of potentiometer 37. The second terminal of photocell 36 is connected through a potentiometer 40 and a variable resistor 41 to the second end terminal of potentiometer 37. Variable resistors 39 and 41 are mechanically connected to one another so that an increase in resistance of one results in a corresponding decrease in the resistance of the other. This permits the zero reading of the bridge circuit to be varied. Potentiometers 38 and 40 are mechanically connected to one another so that an increase in resistance of one results in a corresponding increase in the resistance of the other. This permits the sensitivity of the bridge circuit to be varied. The contactors of potentiometers 38 and 40 are connected to the respective input terminals of a servo amplifier 42. The output signal from amplifier 42 energizes a reversible motor 43. The drive shaft of motor 43 is connected to the contactor of potentiometer 37.

The drive shaft of motor 43 is also connected to the contactor of a telemetering potentiometer 45. A voltage source 46 is connected across the end terminals of potentiometer 45. The contactor and one end terminal of potentiometer 45 are connected to respective output terminals 47 and 48 which in turn are connected to controller 28 of FIGURE 1.

The outlet of a liquid storage tank 50 is connected by means of a conduit 51 to the inlet of sample cell 30. The outlet of sample cell 30 is connected by means of a conduit 52 to a container 53. A pump 54 in conduit 51 directs a solution of barium chloride from container 50 through sample cell 30 to container 53. Any source of barium ions could be so employed. A conduit 55 is connected between container 53 and the inlet of sample cell 31. A vent conduit 56 is connected to the outlet of sample cell 31. Conduit 55 has a pump 57 therein to direct fluid from container 53 through sample cell 31.

The barium chloride solution directed through sample cell 30 is colorless. This results in a relatively large light transmission through the sample cell so that photocell 34 provides a relatively large output current. A portion of the sample stream supplied to analyzer 26 from vessel 19 of FIGURE 1 is added to container 53. The sulfate ions in this sample stream combine with the barium ions in container 53 to form a precipitate. The amount of precipitate formed in container 53 is a function of the concentration of the sulfate ions in the sample stream removed from vessel 19. The resulting material is directed through sample cell 31. The amount of radiation transmitted through cell 31 is thus less than the radiation transmitted through cell 30 so that photocell 36 generates less current than does photocell 34.

The output currents from photocells 34 and 36 are connected in opposition to one another across the illustrated bridge network. The bridge initially is balanced under reference conditions by adjusting the position of small trimmers, not shown, in the light beams so that the current generated by each photocell is equal to that generated by the other. The zero reading is adjusted by moving the contactors of variable resistors 39 and 41 in unison, and the full scale span is adjusted by moving the contactors of potentiometers 38 and 40 in unison. A balanced condition is obtained when the potential between the contactors of potentiometers 38 and 40 is zero. Any change in the relative amounts of light transmitted through the two sample cells changes the relative currents generated by the two photocells so that the potential at the contactors of potentiometers 38 and 40 is no longer zero. This results in a direct current signal being applied to the input terminals of amplifier 42. The polarity of this signal depends upon the relative light transmissions through the two sample cells. This direct current signal is converted into a corresponding alternating current signal which is amplified and applied to motor 43. Motor 43 rotates in a direction to move the contactor of potentiometer 37 until the bridge circuit is again balanced, as indicated by the potential between the contactors of potentiometers 38 and 40 being zero. Amplifier 42 and motor 43 can be any known type of equipment, such as of the form described in Electronic Control Handbook Batcher and Moulick, Caldwell-Clements, Inc., New York, 1946, page 298, for example.

As previously mentioned, an important feature of the analyzer resides in controlling the rate of addition of the sample stream to container 53. A conduit 60, having a needle valve 61 therein, communicates at one end with the junction between sample conduits 24 and 27. The second end of conduit 60 terminates at a region above container 53 so that a portion of the sample stream circulated through conduits 24 and 27 can be dropped into container 53. Needle valve 61 is adjusted so that the stream falls into container 53 as individual droplets. A funnel 62 normally is retained beneath conduit 60 by means of a spring 63. The droplets falling into funnel 62 are removed from the system through a drain conduit 64. A solenoid 65 is mounted adjacent funnel 62 so that the funnel is displaced against the force of spring 63 when the solenoid is energized. This permits the droplets from conduit 60 to fall into container 53. Container 53 is provided with a magnetically actuated stirrer 66 which provides mixing of the barium and sulfate ions.

Apparatus is provided to count the rate at which the droplets fall from conduit 60. A beam of radiation from a lamp 70 is directed by lens 71 through an aperture in a plate 72 so as to interest the falling droplets. This beam of radiation impinges upon a photoelectric tube 73. Each falling droplet momentarily blocks the light beam. The cathode of tube 73 is connected to ground, and the anode thereof is connected through a resistor 74 to a positive potential terminal 75. The anode of tube 73 is also connected through a capacitor 76 to the control grid of a triode 77. The control grid of triode 77 is connected to ground through a resistor 78. The cathode of triode 77 is connected to ground through a resistor 79 which is shunted by a capacitor 80. The anode of triode 77 is connected to terminal 75 through the coil of a relay 81.

Each time the radiation beam is blocked by a falling droplet, the conduction through tube 73 is momentarily extinguished. This results in the potential at the anode of tube 73 increasing rapidly. The resulting positive pulse is applied through capacitor 76 to the control grid of triode 77. This pulse causes tube 77 to conduct momentarily to energize the coil of relay 81.

Figure 3:
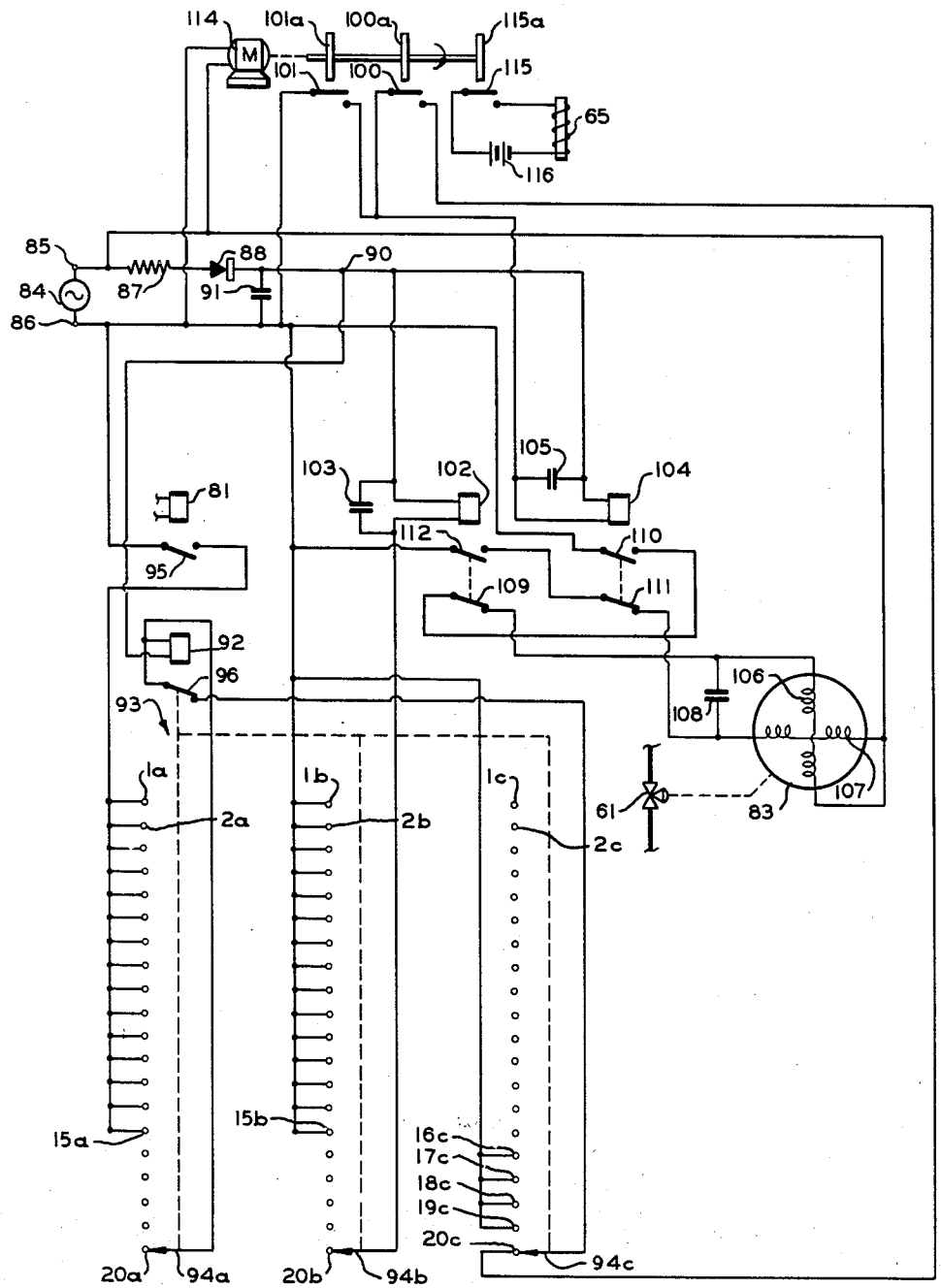
FIGURE 3 is a schematic circuit drawing of the dropping rate control mechanism.

The apparatus employed to control needle valve 61 is illustrated in FIGURE 3. Needle valve 61 is adjusted by rotation of a reversible two-phase servo motor 83. The control circuit of FIGURE 3 is energized from a source of alternating current 84 which has output terminals 85 and 86. Terminal 85 is connected through a resistor 87 and a rectifier 88 to a terminal 90. A capacitor 91 is connected between terminals 86 and 90. A direct current operating potential thus exists between terminals 90 and 86. Terminal 90 is connected to the first terminal of a coil 92 which energizes a stepping switch 93. The second terminal of coil 92 is connected to a first switch arm 94a of the stepping switch. Switch arm 94a is adapted to engage a first bank of contacts 1a, 2a, . . . 20a in sequence when coil 92 is energized. Contacts 1a, 2a . . . 15a are connected to one another and to terminal 86 through a switch 95 which is closed each time relay coil 81 is energized. The second terminal of coil 92 is also connected through an interrupter switch 96 to a second switch arm 94c of the stepping switch. Switch arm 94c is adapted to engage contacts 1c, 2c . . . 20c in sequence. Contacts 16c, 17c, 18c, and 19c are connected to one another and to terminal 86. Contact 20c is connected through switches 100 and 101 to terminal 86. Stepping switch 93 is provided with a third switch arm 94b which is adapted to engage contacts 1b, 2b . . . 20b in sequence. Contacts 1b, 2b . . . 15b are connected to one another and to terminal 86. Switch arm 94b is connected to terminal 90 through the coil of a relay 102. A capacitor 103 is connected in parallel with the coil of relay 102. The stepping switch may be of the rotary type described in Catalog 4071–B, American Automatic Electric Sales Company, Chicago, Illinois, pages 21 to 25 (1937) for example.

The coil of a relay 104 is connected between terminals 90 and 86 through switch 101. A capacitor 105 is connected in parallel with the coil of relay 104. Motor 83 is provided with first and second windings 106 and 107 which are mounted at right angles to one another. Corresponding first terminals of windings 106 and 107 are connected to one another and to terminal 85. A capacitor 108 is connected between the second end terminals of windings 106 and 107. The second terminal of winding 106 is connected through switches 109 and 110 to terminal 86. The second terminal of winding 107 is connected through switches 111 and 112 to terminal 86. Switch 109 is opened and switch 112 is closed when relay 102 is energized. Switch 111 is opened and switch 110 is closed when relay 104 is energized.

Switches 100 and 101 are adapted to be closed by respective cams 100a and 101a which are rotated by a synchronous motor 114. Motor 114 is energized by current source 84. A third cam 115a is rotated by motor 114 to close a switch 115. Switch 115 is connected in circuit with a voltage source 116 and solenoid 65. If is normally desired that only about one out of every fifteen drops from conduit 60 fall into container 53. Cam 115a is set so that switch 115 is closed momentarily to permit funnel 62 to be displaced. This can occur once every minute, for example. Cam 100a is set to close switch 100 momentarily at the beginning of each calibration cycle. Cam 101a closes switch 101 at the beginning of each calibration cycle and keeps the switch closed a predetermined time interval, which can be one minute, for example.

The calibration cycle begins by cam 100a closing switch 100 momentarily. Swith 101 is closed almost immediately thereafter to energize relay 104. At the same time, the stepping switch is advanced one position because a circuit is completed through coil 92 by means of switch arm 94c and contact 20c. This moves the three switch arms to the first contacts. Relay 102 is energized through switch arm 94b and contact 1b. Thus, relays 102 and 104 are energized almost simultaneously at the beginning of the cycle. The stepping switch is then energized to move the switch arms to the next contacts each time relay 81 is energized by a droplet from conduit 60 interrupting the radiation beam. At the end of the one minute period, switch 101 is opened by cam 101a. This deenergizes relay 104. Motor 83 is then connected across current source 84 so as to be rotated in a first direction if relay 102 is still energized. This rotation of motor 83 is in a direction so as to increase the opening in needle valve 61 to increase the dropping rate. Motor 83 thus continues to rotate until the switch arms move into engagement with the 16th contacts. At this time, relay 102 is deenergized so that motor 83 is no longer connected to current source 84. The arms of the stepping switch are rapidly returned to the 20th contacts by the circuit completed through contacts 16c, 17c, 18c, and 19c.

If the dropping rate should be such that the arms of the stepping switch reaches the 16th contacts before switch 101 is opened, relay 102 becomes deenergized while relay 104 remains energized. This connects motor 83 across current source 84 in the opposite manner so that the motor is rotated in a second direction. This motor rotation tends to close needle valve 61 and decrease the dropping rate. Needle valve 61 thus tends to be positioned so that 15 droplets fall from conduit 60 during the period that switch 101 is closed by cam 101a.

The particular number of droplets in a given time interval obviously depends upon the size of needle valve 61 and the desired rate of sample addition to container 53. The number of contacts employed on the stepping switches and the length of timing cycle obviously can be varied to accommodate different desired rates.

It should be evident that the control system of FIGURE 3 can be applied to any type of operation in which it is desired that a certain number of repetitive events shall occur in a designated period of time. Thus, this invention is by no means limited to the particular dropping rate control described herein.

In view of the foregoing description, it should be apparent that there is provided in accordance with this invention improved apparatus for controlling repetitive operations and for regulating the rate of addition of materials to containers.

While the invention has been described in conjunction with a present preferred embodiment, it obviously is not limited thereto.

What is claimed is:

1. Apparatus to add a liquid to a container comprising a conduit positioned above the container so that a liquid in said conduit can fall into said container, a valve in said conduit to regulate the rate of addition of liquid to said container from said conduit, a radiation detector, means to direct a beam of radiation on said detector in a direction so that liquid falling from said conduit interrupts said beam, means responsive to said detector to count a predetermined number of interruptions of said beam and to establish a first signal representative thereof, means to establish a second signal representative of a predetermined time interval, means to actuate said means to count and simultaneously actuate said means to establish a second signal, means to compare said first and second signals, and means responsive to said means to compare to regulate said valve to maintain the flow of liquid from said conduit at a predetermined rate.

2. The combination in accordance with claim 1 wherein said means to count comprises a stepping switch which is energized by each of said interruptions; and said means to regulate comprises a reversible motor connected to said valve, said motor being rotatable in a first direction to open said valve and in a second direction to close said valve.

3. Apparatus to control repetitive events comprising means to count the events, a stepping switch for establishing a first signal responsive to a predetermined number of actuations of said stepping switch, means to energize said stepping switch responsive to each count of an event by said means to count, means to measure a predetermined time interval and to establish a second signal representative thereof, means to actuate said stepping switch and simultaneously actuate said means to measure, means to compare said second signal with the position of said stepping switch, and control means responsive to said means to compare for controlling the rate of occurrence of said events.

4. A method of adding a liquid to a container which comprises causing the liquid to fall drop-by-drop from a point above the container into the container, passing a beam of radiation through the falling liquid, counting a predetermined number of interruptions of said beam and establishing a first signal representative thereof, establishing a second signal representative of a predetermined time interval, the steps of counting and establishing a second signal commencing simultaneously, increasing the rate of supply of liquid to said point above said container responsive to the length of the interval between the time of occurrence of said first and second signals when said second signal occurs before said first signal and decreasing the rate of supply of liquid to said point above said container responsive to the length of the interval between the time of occurrence of said first and second signals when said first signal occurs before said second signal to maintain the flow of liquid from said point above the container into said container at a predetermined rate.

5. Apparatus to add a liquid to a container comprising a conduit positioned above the container so that a liquid in said conduit can fall into said container, a valve in said conduit to regulate the rate of addition of liquid to said container from said conduit, a radiation detector, means to direct a beam of radiation on said detector in a direction so that liquid falling from said conduit interrupts said beam, a stepping switch, means responsive to the output of said radiation detector for energizing said stepping switch each time said beam is interrupted, means for establishing a first signal representative of the expiration of a predetermined time interval, means to actuate said stepping switch and simultaneously actuate said means for establishing a first signal, a reversible motor connected to said valve, said motor being rotatable in a first direction to open said valve and in a second direction to close said valve, means responsive to said first signal and to the energization of a predetermined position of said stepping switch to cause said motor to rotate in said first direction during the interval between the occurrence of said first signal and the occurrence of the energization of said predetermined position when the occurrence of said first signal precedes the energization of said predetermined position and to cause said motor to rotate in said second direction during the interval between the occurrence of the energization of said predetermined position and the occurrence of said first signal when the occurrence of the energization of said predetermined position precedes the occurrence of said first signal, to maintain the flow of liquid from said conduit at a predetermined rate.

References Cited in the file of this patent

UNITED STATES PATENTS

| | | |
|---|---|---|
| 2,577,615 | Garrison | Dec. 4, 1951 |
| 2,604,249 | Gorham | July 22, 1952 |
| 2,668,097 | Hallikainen | Feb. 2, 1954 |
| 2,710,715 | Gorham | July 14, 1955 |
| 2,807,012 | Schwarz | Sept. 17, 1957 |
| 2,953,440 | Claudy | Sept. 20, 1960 |